(12) United States Patent  
Morris

(10) Patent No.: US 10,422,540 B2
(45) Date of Patent: Sep. 24, 2019

(54) EVAPORATIVE COOLING DEVICE AND CONTROL SYSTEM

(71) Applicant: Matthew Morris, Marietta, GA (US)

(72) Inventor: Matthew Morris, Marietta, GA (US)

(*) Notice: Subject to any disclaimer, the term of this patent is extended or adjusted under 35 U.S.C. 154(b) by 29 days.

(21) Appl. No.: 14/874,701

(22) Filed: Oct. 5, 2015

(65) Prior Publication Data

US 2017/0097166 A1    Apr. 6, 2017

(51) Int. Cl.
| | |
|---|---|
| *F24F 5/00* | (2006.01) |
| *F24F 1/42* | (2011.01) |
| *F24F 6/06* | (2006.01) |
| *F24F 6/08* | (2006.01) |
| *F24F 13/22* | (2006.01) |

(52) U.S. Cl.
CPC ............ *F24F 5/0035* (2013.01); *F24F 1/42* (2013.01); *F24F 6/06* (2013.01); *F24F 6/08* (2013.01); *F24F 2013/225* (2013.01)

(58) Field of Classification Search
CPC .... F24F 5/0035; F24F 1/42; F24F 6/06; F24F 2013/225; F24F 6/08
See application file for complete search history.

(56) References Cited

U.S. PATENT DOCUMENTS

| | | | | |
|---|---|---|---|---|
| 1,817,442 A | * | 8/1931 | Martin, Jr. ............... | F24F 6/06 128/203.12 |
| 1,976,401 A | * | 10/1934 | Ilg .......................... | F24F 3/1603 126/113 |
| 2,074,265 A | * | 3/1937 | Kirby ....................... | F24F 6/06 261/90 |
| 2,106,560 A | * | 1/1938 | Barrett ..................... | F25D 3/10 261/130 |
| 2,210,354 A | * | 8/1940 | Bates ....................... | F24F 6/06 261/30 |
| 2,443,562 A | | 9/1945 | Hieger et al. | |
| 2,703,228 A | * | 3/1955 | Fleisher ................. | B01D 47/18 222/504 |
| 2,780,078 A | * | 2/1957 | Teplitz .................... | F24F 6/06 159/8 |
| 2,841,131 A | | 7/1958 | Zupancic | |
| 2,902,834 A | * | 9/1959 | Bosworth, Jr. .......... | F24F 1/02 261/80 |
| 3,306,591 A | * | 2/1967 | Valazza .................... | F24F 6/04 159/16.1 |

(Continued)

OTHER PUBLICATIONS

Cool Metal Roofing Energy Star—McElroy Metal (Jan. 2007).*
Measuring Wet Bulb Temperature without a Wetbulb Thermometer Slide Rule Method—Ingham (Oct. 2010).*

*Primary Examiner* — Jianying C Atkisson
*Assistant Examiner* — Jenna M Hopkins
(74) *Attorney, Agent, or Firm* — Bekiares Eliezer LLP

(57) ABSTRACT

An evaporative cooling device may be provided. The device may comprise a plurality of rollers, a screen looped around the plurality of rollers, a motor coupled to at least one roller and configured to drive the at least one roller, a basin configured to hold a liquid within an interior of the basin, and wherein at least one roller is at least partially within the interior of the basin. The screen may travel into the basin and capture an amount of the liquid. As the liquid is drawn into an airstream feeding a heat rejection device, the liquid may evaporate, cooling the air. The cooled air may provide a more efficient heat rejection device.

19 Claims, 15 Drawing Sheets

(56) References Cited

U.S. PATENT DOCUMENTS

| | | | | |
|---|---|---|---|---|
| 3,339,902 A | * | 9/1967 | Martin | B29C 67/0011 261/142 |
| 3,348,828 A | * | 10/1967 | Laing | F04D 17/04 159/16.1 |
| 3,371,914 A | | 3/1968 | Walker | |
| 3,398,511 A | * | 8/1968 | Gustavsson | B01D 46/18 55/290 |
| 3,476,365 A | * | 11/1969 | Agerley | F24F 6/06 237/78 R |
| 3,705,479 A | * | 12/1972 | McPherson | B01D 47/18 96/259 |
| 3,739,597 A | * | 6/1973 | Schulze, Sr. | F24F 3/14 62/311 |
| 3,740,959 A | * | 6/1973 | Foss | F24F 3/1417 62/3.4 |
| 3,760,846 A | | 8/1973 | Taplin | |
| 3,756,211 A | | 9/1973 | Taplin | |
| 3,800,553 A | * | 4/1974 | Engalitcheff, Jr. | F28D 5/02 62/310 |
| 3,869,529 A | * | 3/1975 | Follette | F24F 3/14 261/130 |
| 3,951,625 A | * | 4/1976 | Follette | F24F 3/14 236/44 C |
| 3,995,567 A | * | 12/1976 | Drake | F23G 5/32 110/190 |
| 4,008,696 A | | 2/1977 | Hisatomi | |
| 4,023,949 A | * | 5/1977 | Schlom | F24F 3/14 62/309 |
| 4,089,915 A | * | 5/1978 | Jackson | F24F 6/02 261/142 |
| 4,094,935 A | * | 6/1978 | Walker | B60H 1/3202 261/80 |
| 4,127,620 A | * | 11/1978 | Sherman | F24F 6/06 261/26 |
| 4,237,080 A | * | 12/1980 | Elliott | F24F 6/06 126/113 |
| 4,284,128 A | * | 8/1981 | Nelson | F24F 6/04 165/47 |
| 4,338,266 A | * | 7/1982 | Flower | B01J 19/32 261/106 |
| 4,353,219 A | * | 10/1982 | Patrick, Jr. | F24F 13/30 62/183 |
| 4,386,038 A | * | 5/1983 | Walker | F24F 6/06 261/80 |
| 4,386,068 A | * | 5/1983 | Mitra | C07K 14/755 530/383 |
| 4,520,864 A | * | 6/1985 | Katagiri | F24F 6/06 165/60 |
| 4,771,611 A | * | 9/1988 | McNab | F24F 3/147 62/311 |
| 4,877,101 A | | 10/1989 | Tada et al. | |
| 4,910,971 A | * | 3/1990 | McNab | F24F 3/044 62/310 |
| 5,015,420 A | * | 5/1991 | Jones | B01F 3/04085 261/106 |
| 5,230,941 A | * | 7/1993 | Hollander | B32B 3/12 428/116 |
| 5,299,548 A | | 4/1994 | Beall | |
| 5,445,214 A | * | 8/1995 | Han | F24F 5/0035 165/11.1 |
| 5,575,266 A | | 11/1996 | Iida | |
| 5,693,266 A | * | 12/1997 | Jung | B01F 3/0407 261/142 |
| 5,706,669 A | * | 1/1998 | Lee | F25D 21/14 62/281 |
| 5,775,580 A | * | 7/1998 | Sizemore | B60H 1/3202 165/222 |
| 6,161,362 A | * | 12/2000 | Forbis, Sr. | F24F 5/0075 47/21.1 |
| 7,608,121 B2 | * | 10/2009 | Boyer | B01D 46/22 55/282.2 |
| 8,382,073 B2 | * | 2/2013 | Tsuda | F24F 6/06 261/92 |
| 8,874,353 B2 | | 10/2014 | Shinagawa | |
| 2004/0144110 A1 | * | 7/2004 | Reeves | A01K 1/0082 62/171 |
| 2005/0000240 A1 | * | 1/2005 | Kucera | F24F 5/0035 62/310 |
| 2005/0138939 A1 | * | 6/2005 | Spanger | F24F 13/222 62/150 |
| 2006/0000227 A1 | * | 1/2006 | Hyland | F24F 5/0035 62/236 |
| 2007/0151278 A1 | * | 7/2007 | Jarvis | F24F 5/0035 62/310 |
| 2010/0050756 A1 | * | 3/2010 | Stewart | F24F 13/22 73/114.55 |
| 2010/0281896 A1 | * | 11/2010 | Al Watban | F24F 5/0035 62/160 |
| 2011/0302946 A1 | * | 12/2011 | Gilbert | F24F 5/0035 62/304 |
| 2012/0047927 A1 | * | 3/2012 | Cantolino | F24F 13/222 62/150 |
| 2014/0316583 A1 | * | 10/2014 | Ambriz | F24F 11/30 700/277 |
| 2015/0090349 A1 | * | 4/2015 | Sada | F24F 11/001 137/386 |
| 2015/0316583 A1 | * | 11/2015 | Li | H01L 22/14 850/18 |
| 2016/0061757 A1 | * | 3/2016 | Callahan | G01N 25/64 62/176.1 |

* cited by examiner

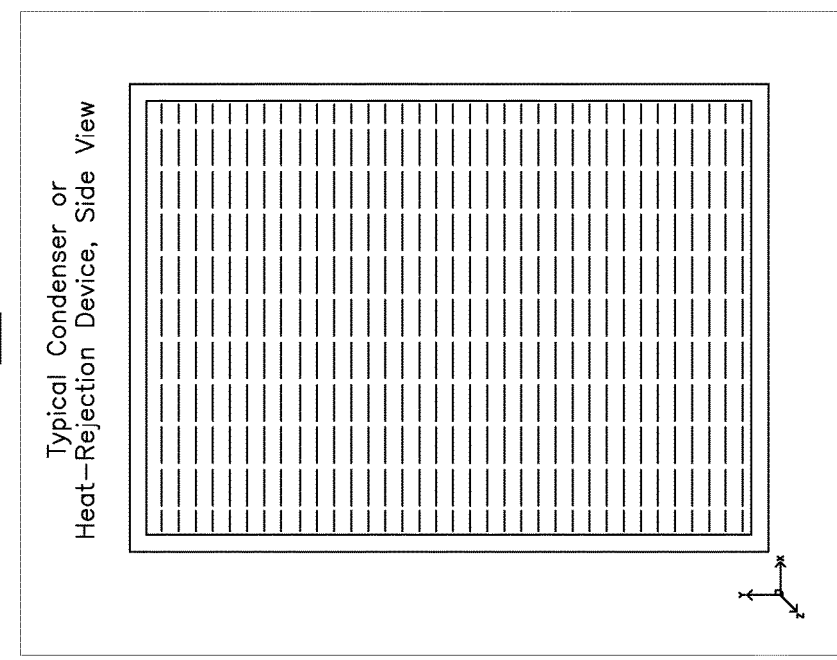
FIG. P1a
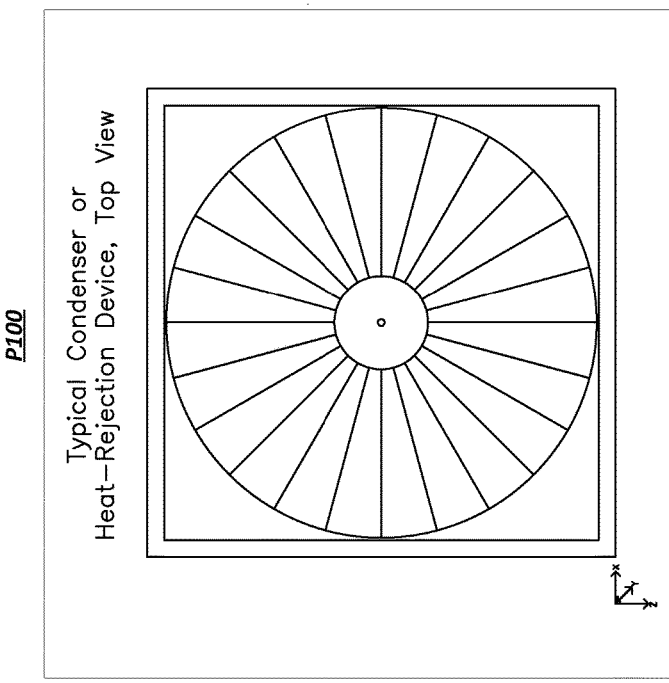
FIG. P1b

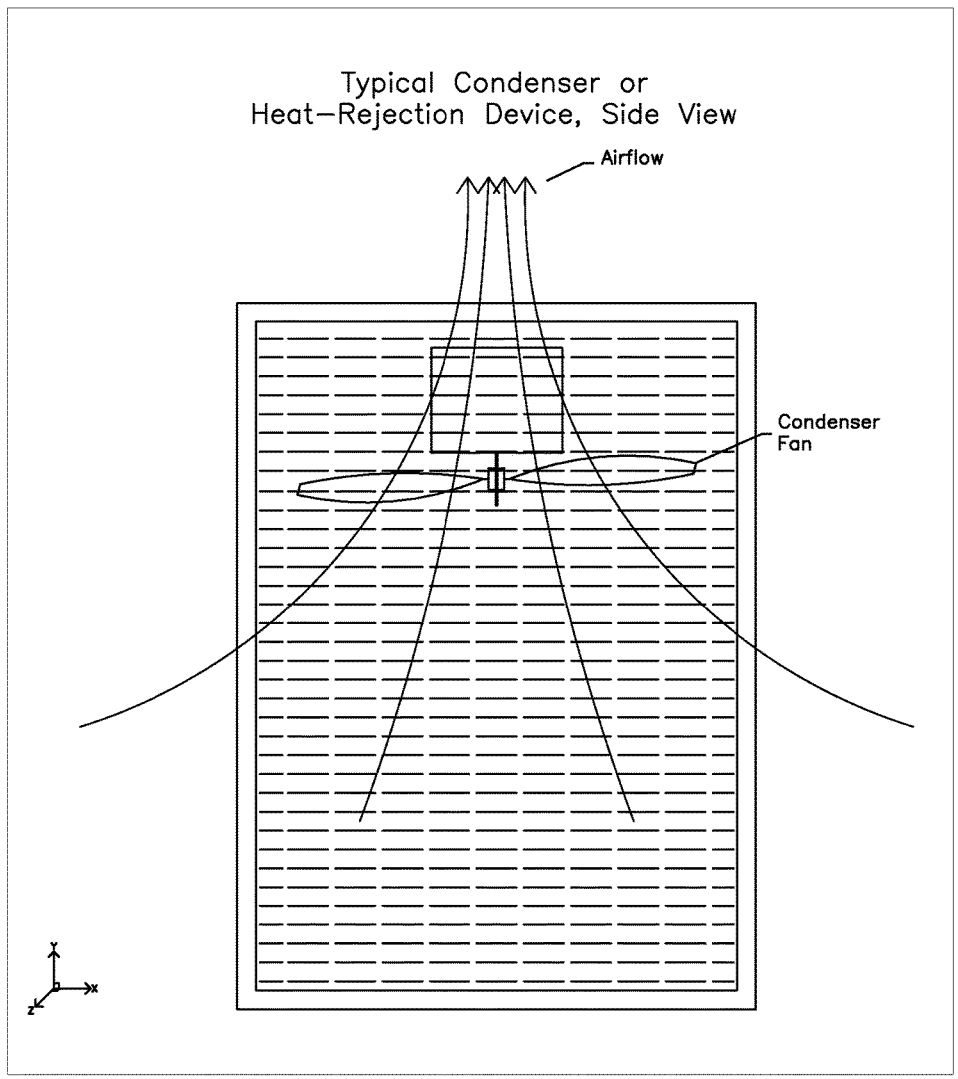
FIG. P2

EVAPORATIVE COOLING DEVICE AND CONTROL SYSTEM

FIELD OF DISCLOSURE

The present disclosure generally relates to evaporative cooling.

BACKGROUND

FIGS. P1a and P1b illustrate a schematic view of a typical Heat-Rejection Device (HRD) (e.g., a residential/commercial air conditioner outdoor unit). Such a unit typically consists of a refrigerant compressor, a surrounding condenser coil, and an internal condenser fan. FIG. P2 is a schematic view of the same typical HRD, with additional layers depicting its internal condenser fan, as well as the approximate airflow pattern that it produces. The fan draws in air through its 4 side condenser surfaces and discharges it vertically (along +y axis). As the air is drawn through the condenser surfaces ("coils" and "fins"), heat within the condenser is transferred to the air and is subsequently rejected to atmosphere as the hot air exits the top. Some HRDs use water cooling to increase efficiency.

The benefits of water cooling have been known and exploited for many years. The key to water's power in cooling comes from its phase change from a liquid to a vapor, wherein it absorbs a great amount of "heat of vaporization." This type of heat is referred to as "latent" heat. Water cooling is sometimes avoided because it usually involves the addition of large industrial infrastructure, but new manufacturers and technologies are working to improve the economics for water-cooling smaller systems. In general, this evaporative cooling effect can apply to essentially any liquid (not just water), when it evaporates into another gaseous medium (including but not limited to air).

In many climatic regions, the water-cooling may reduce condenser temperatures (and thus pressures) more efficiently than air cooling. This reduces the discharge pressure (or "head") of the compressor, and consequently the load (or "lift") of the compressor, allowing the system to deliver the same cooling power with less input power. Such compressors are typically driven by an electric motor; the motor is typically an "induction" motor, running on alternating current (AC). The electrical power consumed by the motor increases with increasing load on the compressor it is driving. This electrical power (P) is proportional to motor's electrical supply voltage (V), its resulting electrical current draw (I), and its resulting power factor (PF):

$$P \sim V*I*PF.$$

When compressor load is reduced, P is reduced through reductions in both current (I) and power factor (PF): a common behavior of AC motors which arises according to the laws of electrodynamics. However, common mnemonics are often used to visualize this electrical behavior through the behavior of water: voltage (V) is analogous to the pressure driving a water stream; and current (I) is analogous to the flow rate of the water stream. Unfortunately, fewer analogies exist to help describe power factor (PF). In short, power factor relates the phase relationship between the AC voltage and current waveforms: when the two waveforms are perfectly in phase (or in "synch"), their power factor is 1; when the two waves are perfectly out of phase (completely not in synch), their power factor is 0. As an AC motor approaches full load, its power factor approaches 1 (say ~80% to 90%); as its load decreases, so does its power factor (~75% or less).

Conventionally, common evaporative cooling systems comprise water nozzles that spray water mist onto the surface of the HRD (assumed to be a condenser hereafter). This spraying configuration is often difficult to adjust geometrically, as the mist is most effective when applied in a homogeneous pattern that perfectly contacts all of the surfaces of the condenser. Multiple spray nozzles are often implemented to mitigate this challenge; as a result, some sections of the condenser surface may be "over sprayed," receiving more water than necessary which hence forms droplets that deflect or fall down the surface as waste. Moreover, spray nozzles are susceptible to clogs and fouling from water deposits, which hinder their effectiveness; the clogs distort the spray pattern's geometry as well as its intended flow rate.

BRIEF OVERVIEW

An evaporative cooling device may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The device may comprise a plurality of rollers, a screen looped around the plurality of rollers, a motor coupled to at least one roller and configured to drive the at least one roller, a basin configured to hold a liquid within an interior of the basin, and wherein at least one roller is at least partially within the interior of the basin. The screen may travel into the basin and capture an amount of the liquid. As the liquid is drawn into an airstream feeding a heat rejection device, the liquid may evaporate, cooling the air. The cooled air may provide a more efficient heat rejection device.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

Figure 1A:
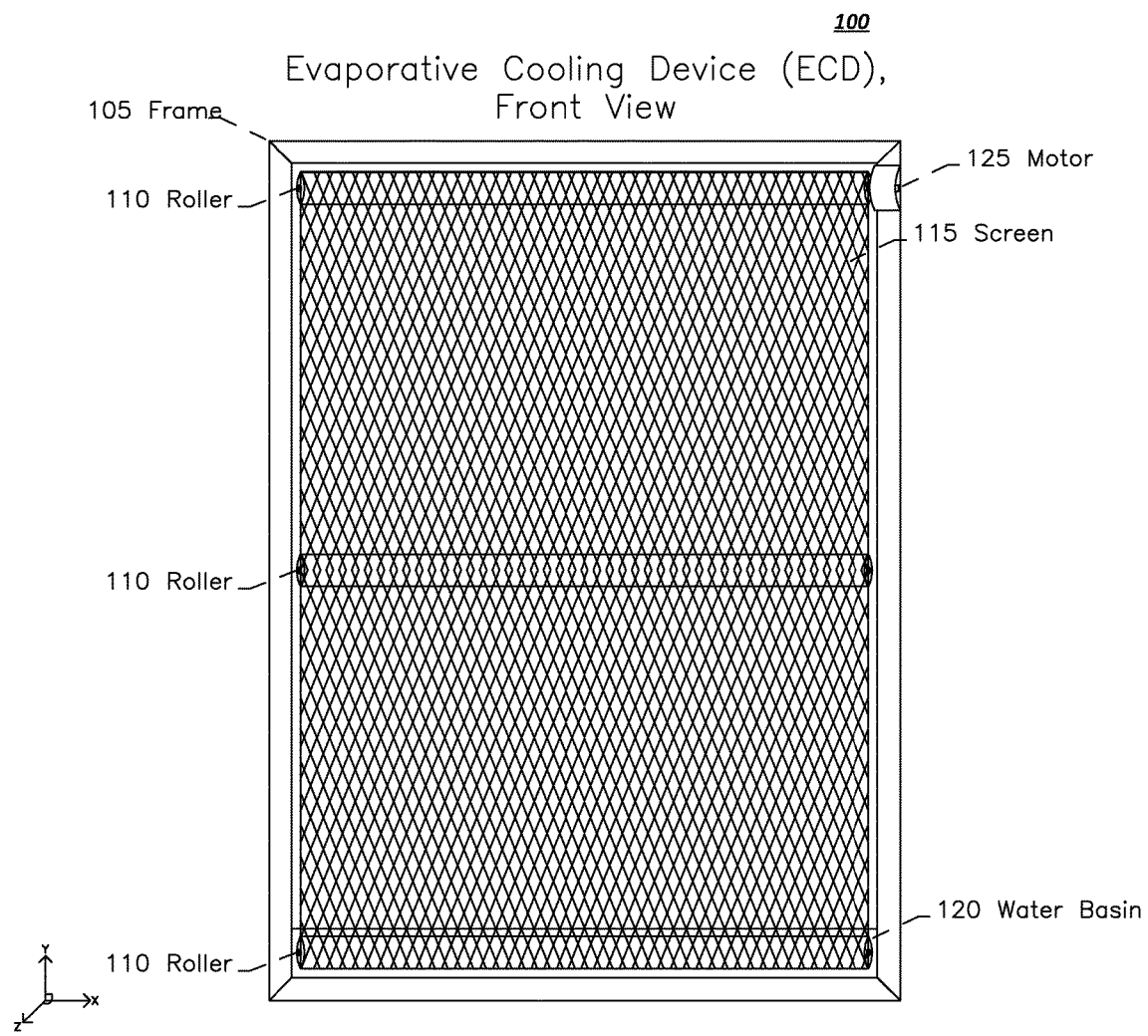
Figure 1B:
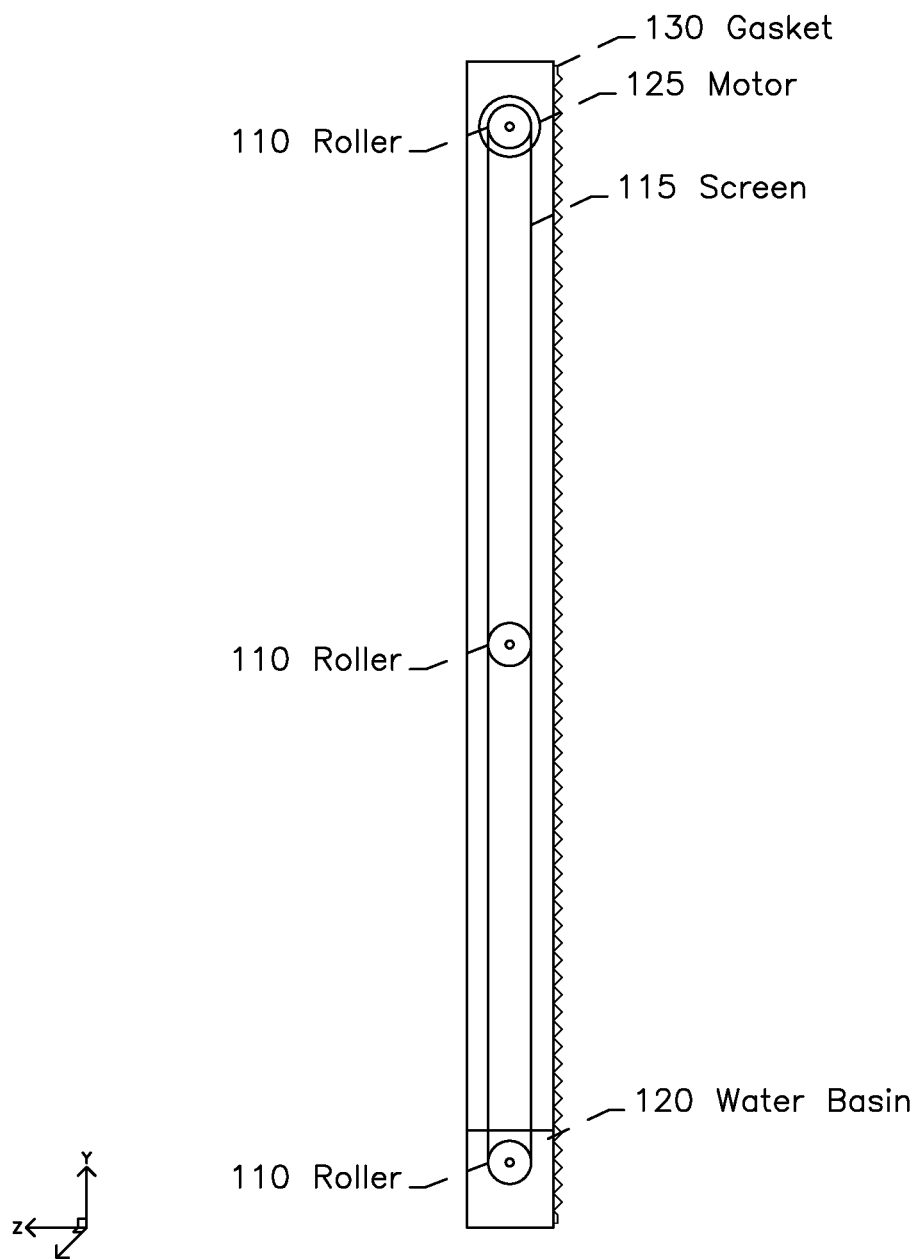
Figure 1C:
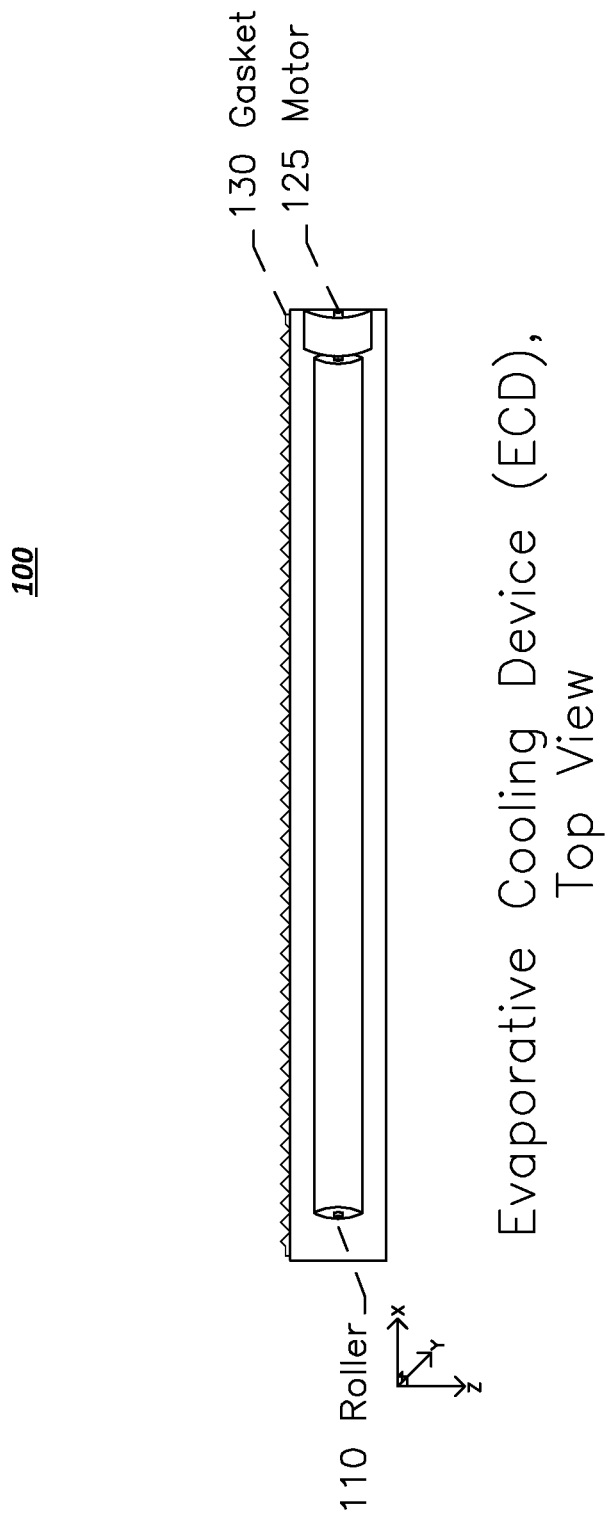
Figure 2:
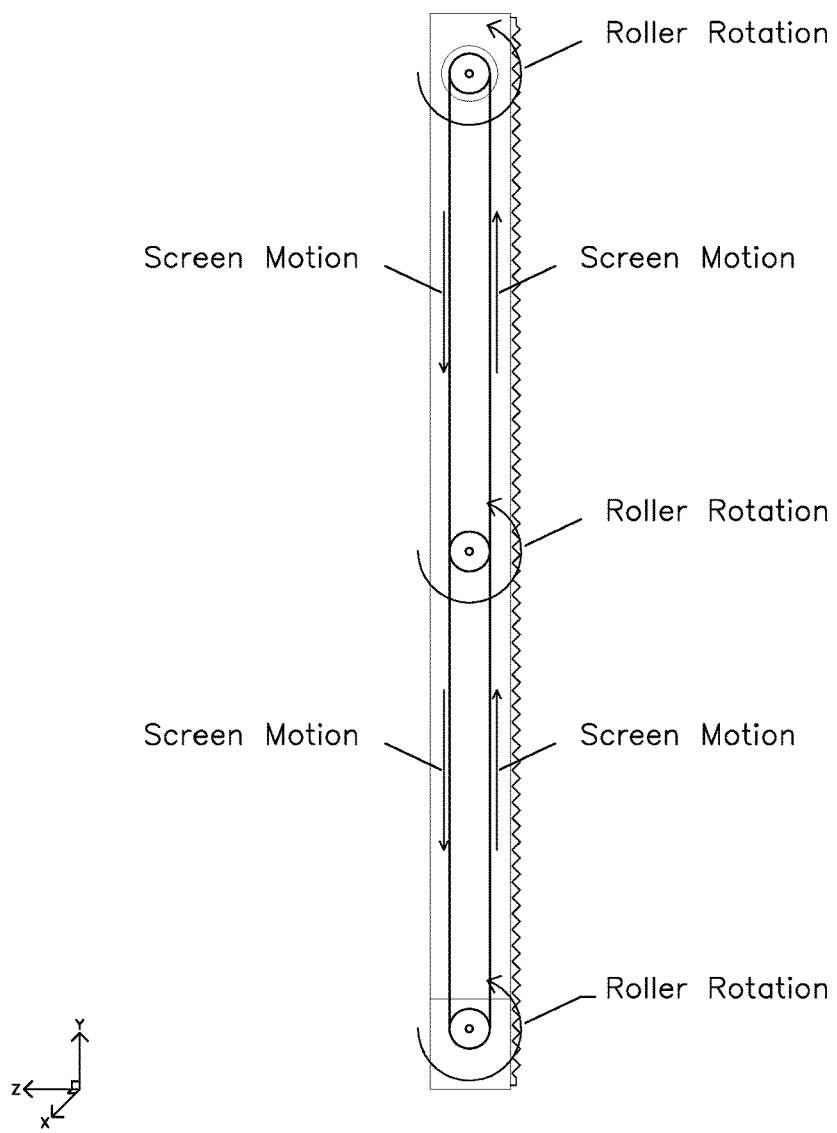
Figure 3:
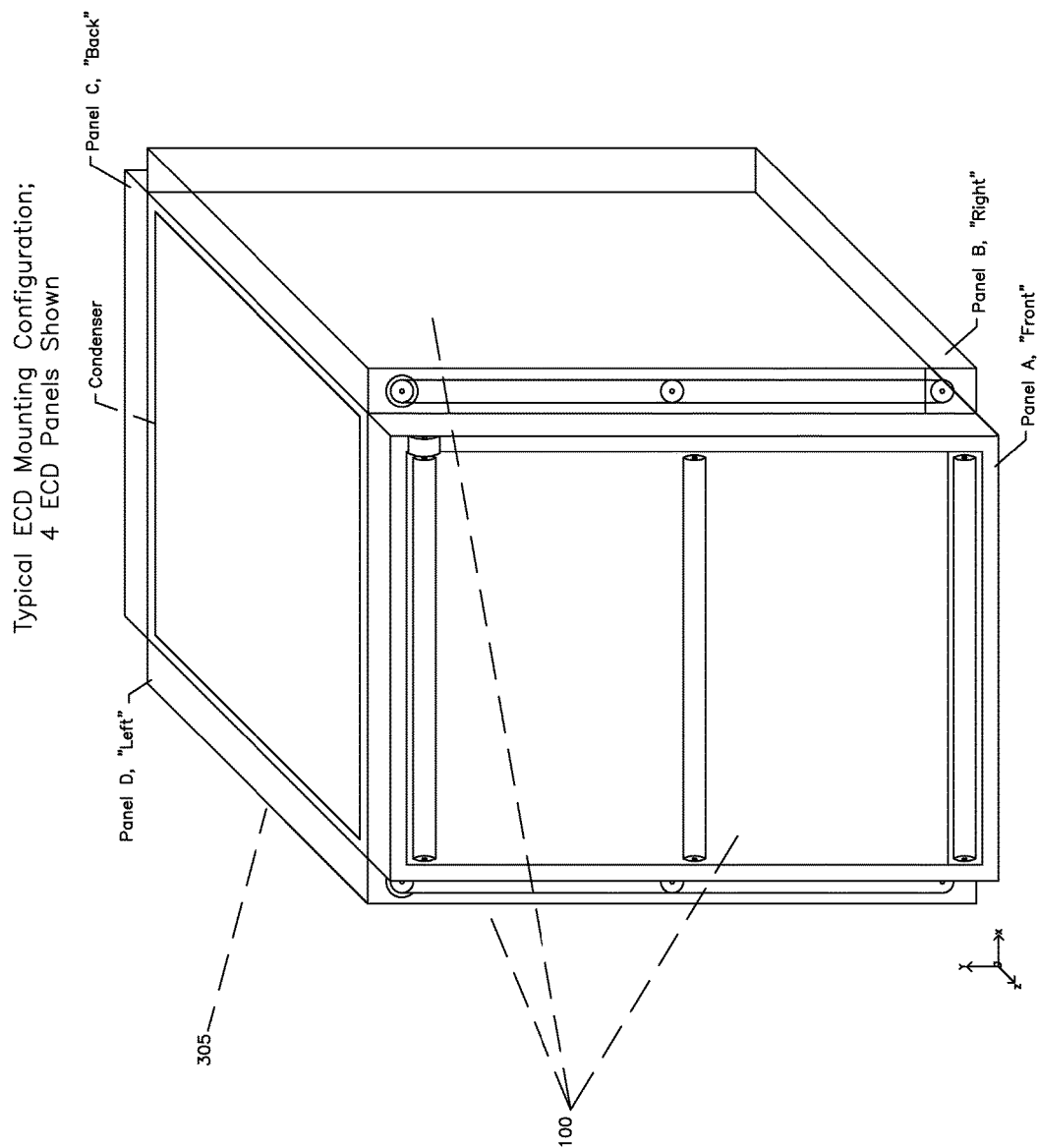
Figure 4:
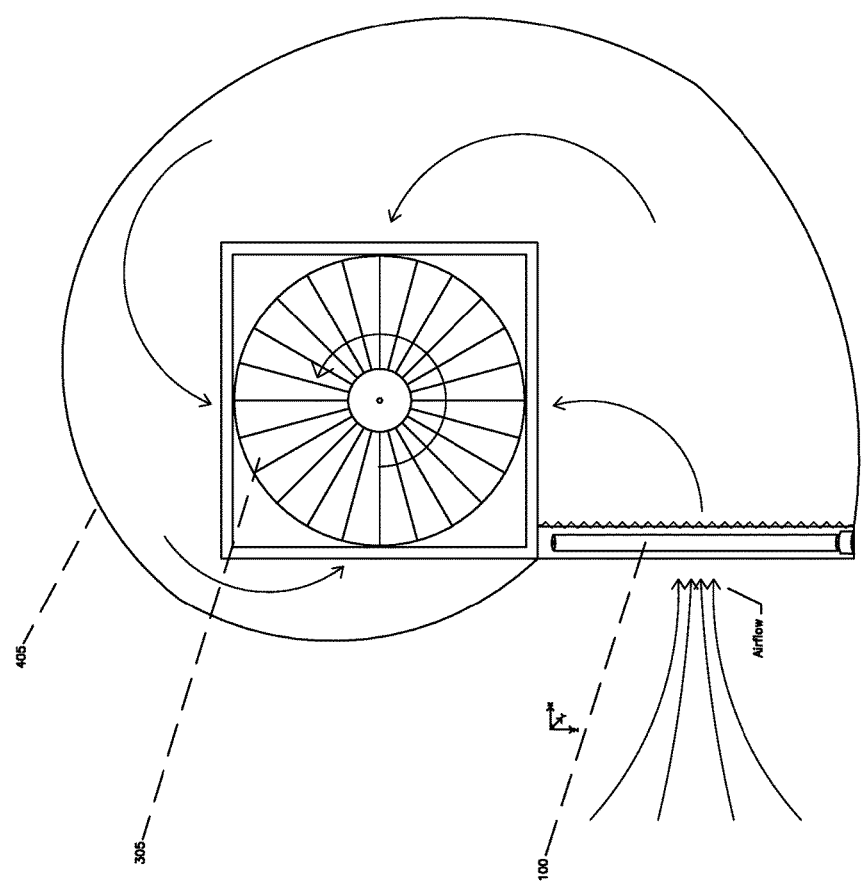
Figure 5A:
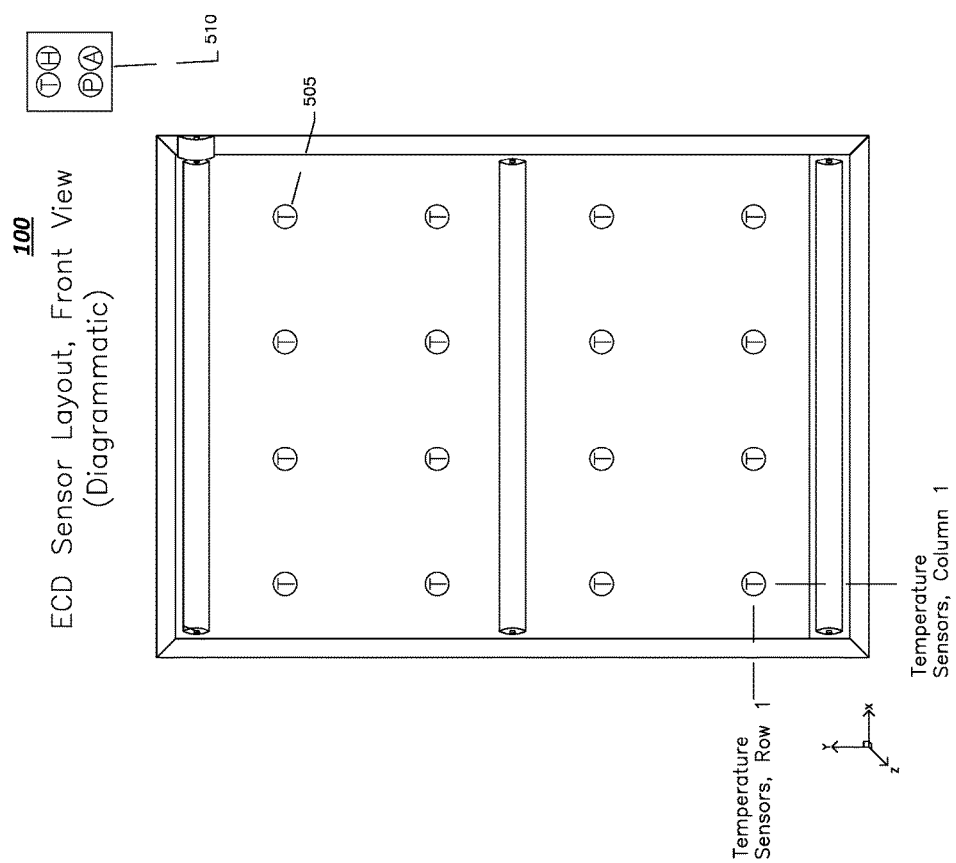
Figure 5B:
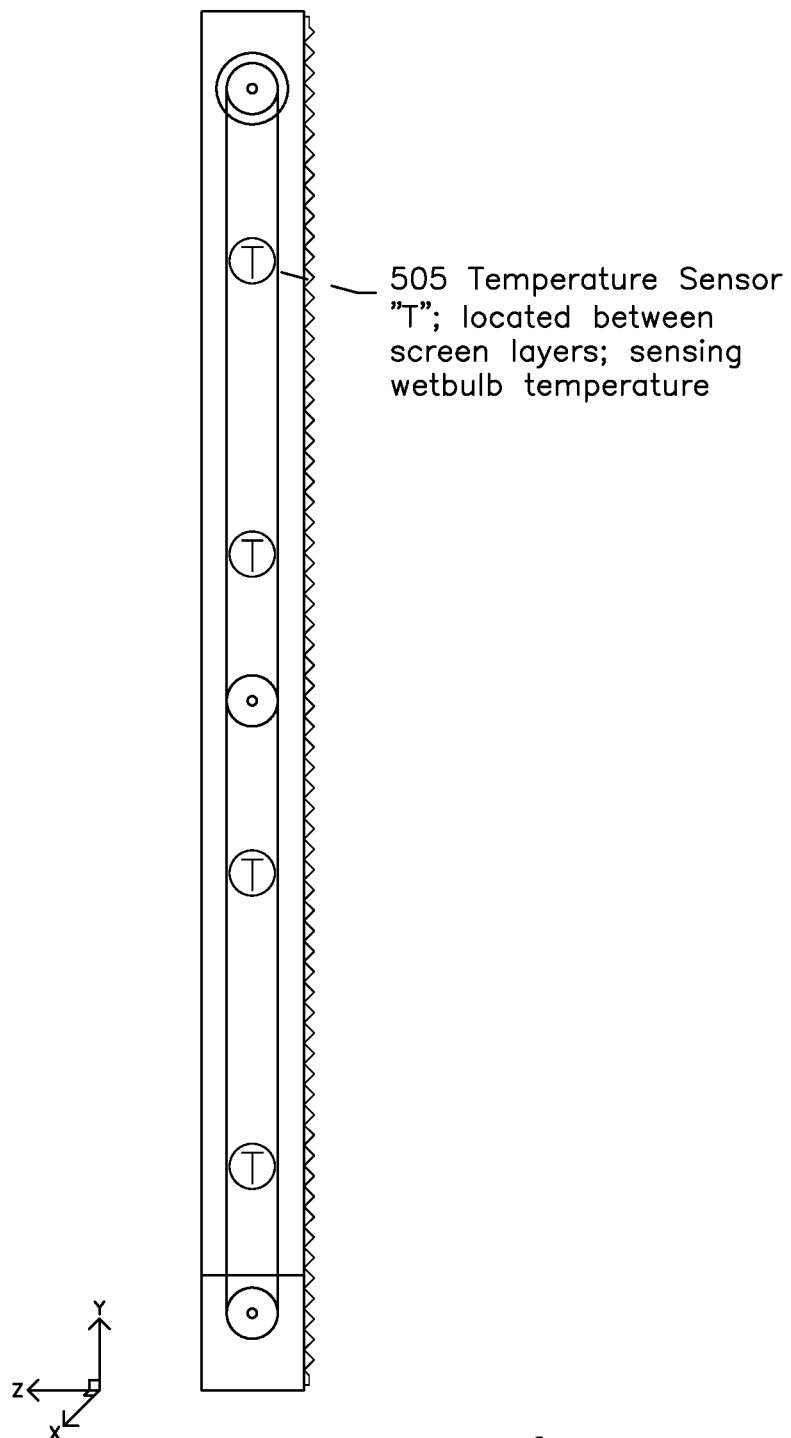
Figure 6:
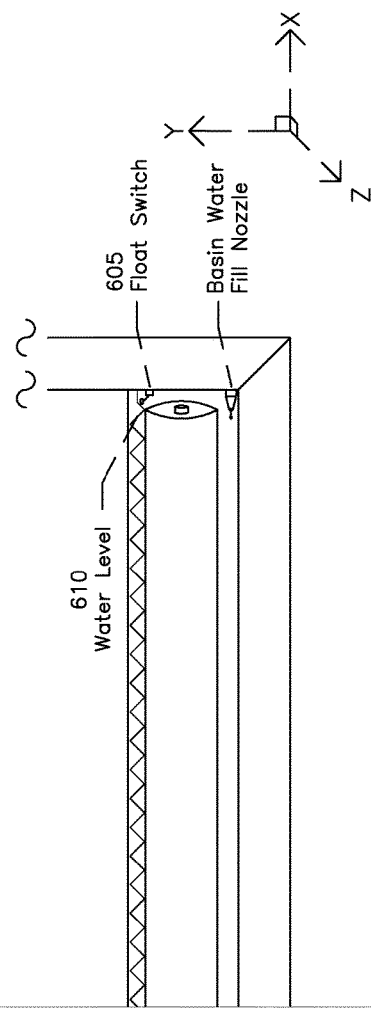
Figure 7:
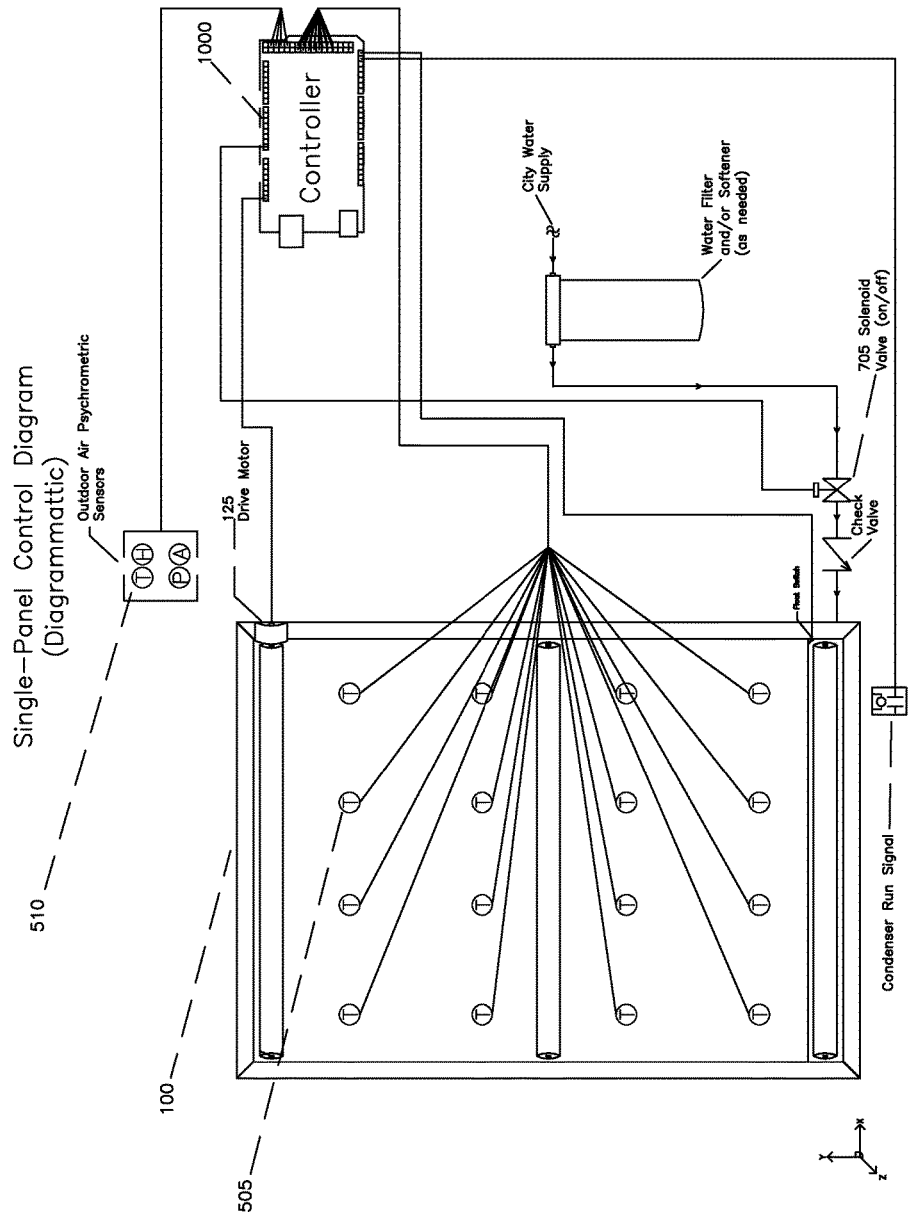

FIGS. P1a and P1b illustrate different schematic views of a typical Heat-Rejection Device HRD;

FIG. P2 is a schematic view of the same typical HRD, with additional layers depicting its internal condenser fan, as well as the approximate airflow pattern that it produces;

FIG. 1a illustrates an embodiment of the proposed Evaporative Cooling Device (ECD);

FIG. 1b illustrates another view of the ECD;

FIG. 1c illustrates yet another view of the ECD;

FIG. 2 illustrates a conveyor motion between rotating rollers and a screen;

FIG. 3 illustrates a set of ECDs attached to a heat rejection device;

FIG. 4 illustrates a single ECD attached to a heat rejection device;

FIG. 5a illustrates an ECD comprising control sensors;

FIG. 5b further illustrates the ECD comprising control sensors;

FIG. 6 illustrates further control components;

FIG. 7 illustrates further water basin and control components.

Figure 8:
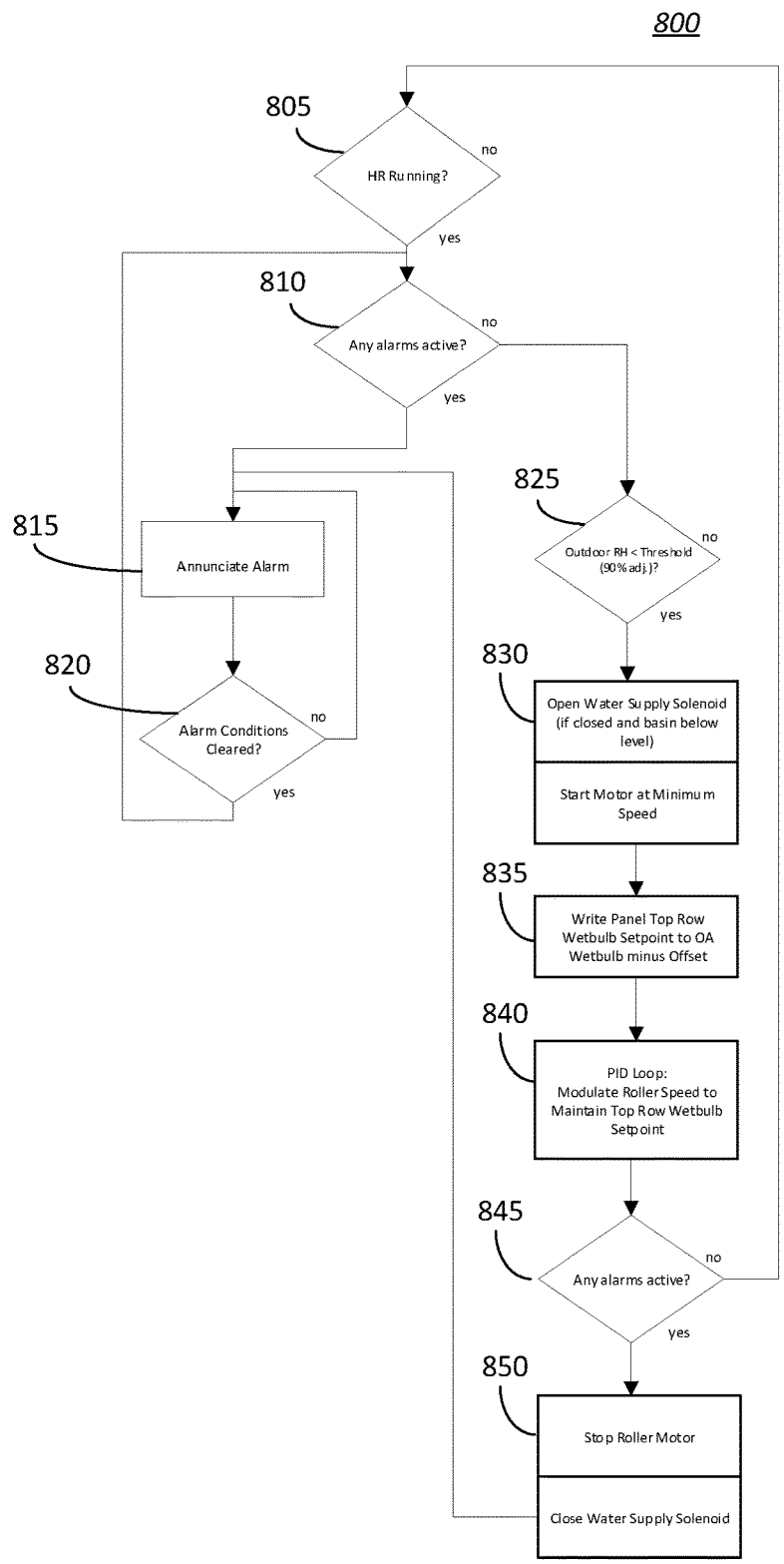
Figure 9:
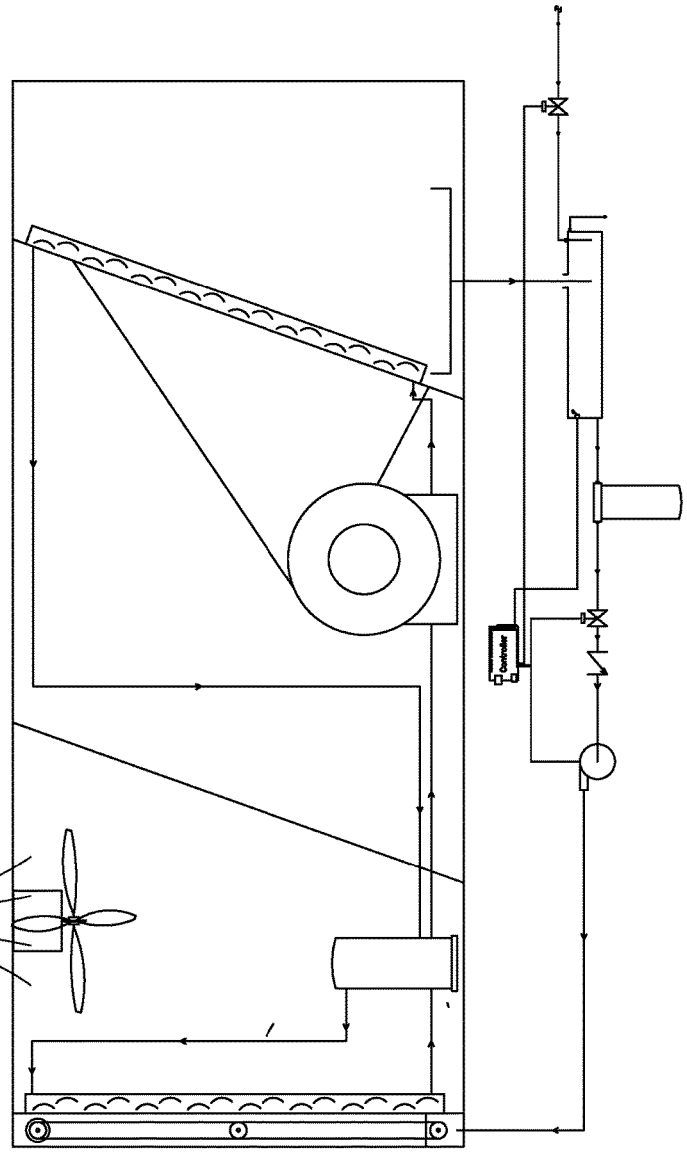

FIG. 8 illustrates a method for controlling the system;

FIG. 9 illustrates a condensate recovery system; and

Figure 10:
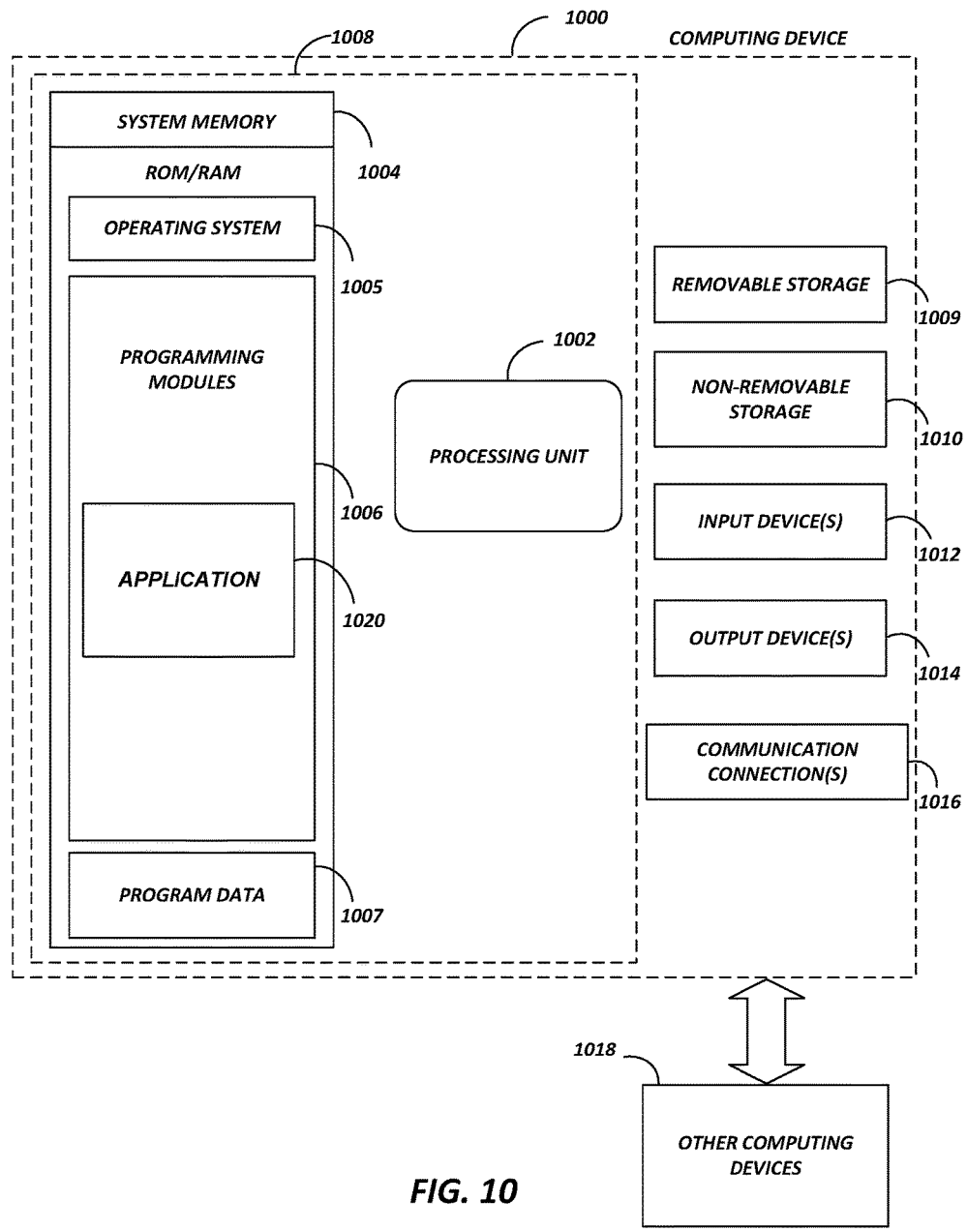

FIG. 10 is a block diagram of a system including a computing device for performing the method of FIG. 8.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, (f)/6th paragraph, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, certain contexts, embodiments of the present disclosure are not limited to use only in this context.

I. Overview

Consistent with embodiments of the present disclosure, an evaporative cooling device (ECD) may be provided. This overview is provided to introduce a selection of concepts in a simplified form that are further described below. This overview is not intended to identify key features or essential features of the claimed subject matter. Nor is this overview intended to be used to limit the claimed subject matter's scope. The ECD may be used by individuals or companies to evaporatively cool air to be passed across a heat rejection device.

The ECD may utilize water's latent heat of vaporization to cool air before it passes a heat exchanger of the heat-rejection device. By running a screen or mesh material through a basin of water, the ECD may use water's surface tension to draw water from the basin. The water that is drawn from the basin may form a sheet of water through which air may pass before passing across a reaching the heat-rejection device. Accordingly, heat from the air may be absorbed by evaporation of the water. In this way, the ECD may provide more effective heat exchanging at the heat-rejection device.

The screen may be looped around rollers and driven by an electric motor. The motor's speed may vary in order to provide the optimal amount of water for evaporating. The motor's speed may be controlled by a controller. Further, the ECD may comprise sensors configured to measure properties of the air after it has passed through the sheet of water. By measuring the air's properties, the ECD may be tuned to optimize performance.

Further embodiments of the ECD may utilize components for measuring water level in the basin and controls for keeping an operable water level. Yet further embodiments may comprise a condensation reclamation device for using condensate from the conditioner's evaporator as the water used by the ECD.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Basic Configuration

The evaporative cooling device (ECD) 100 may provide a method of administering evaporative cooling liquid. In some embodiments, the evaporative cooling liquid may be comprised of, but not be limited to, water. Accordingly, although water is used throughout the present disclosure, it should be understood that other liquids may be used.

FIGS. 1*a*, 1*b*, and 1*c* illustrate an embodiment of an ECD 100 consistent with embodiments of the present disclosure, comprising, but not limited to: a frame 105; a plurality of rollers 110; a screen medium 115 (hereafter, "screen" or "screen material") fashioned in a loop; a basin 120 configured to hold water; a motor (e.g., a variable-speed, low-voltage motor) 125 attached to the top "drive" roller; and a gasket material 130 to seal the perimeter of the ECD to the condenser face.

While materials are disclosed herein, it should be understood that they are to be exemplary, rather than limiting. The frame may comprise wood and/or plastic. The rollers may comprise plastic. The screen may comprise plastic, and may be fashioned in a loop in order to continuously travel along the rollers (e.g., as shown with a flattened cylinder shape).

The ECD may be configured such that as the rollers 110 rotate, the screen 115 may travel into the water basin 120, collect water, and then travel upward. The ECD may be placed upstream of the HRD's inlet airflow. In this way, the inlet airflow may traverse the ECD's wetted screen material. As the air flows through the wetted screen, the water may evaporate and cool the airstream entering the HRD.

III. Basic Operation

As the motor rotates a primary drive roller, the screen medium 115 may be conveyed downward into the water basin, and then back upward across the airstream as it traverses the bottom roller. As the screen material submerges into the water basin, water "sticks" to the grid sections within the screen and forms droplets among the lattice structure of the screen. This "sticking" occurs according to water's inherent molecular properties and forces—such as surface tension, adhesion, and cohesion. As this wetted grid is conveyed upward into the airstream, the rectangular "sheet" of water produced readily evaporates. FIG. 2 diagrammatically depicts this "conveyor" motion between the rotating rollers and "revolving" screen. Additional rollers may be added as needed to provide support for different configurations and geometries: including (but not limited) rollers placed on the exterior of the screen loop to provide bi-directional stabilization of the moving screen.

IV. Mounting Configurations

FIG. 3 depicts a potential ECD mounting configuration, wherein 4 separate ECD panels may be affixed to the 4 inlet faces of the condenser 305. In further embodiments, a single ECD panel may serve more than one condenser face. FIG. 4 (diagrammatic) shows a mounting configuration, wherein single ECD panel may serve all 4 condenser faces through an accessorized adapter shroud 405. In such embodiment, the shroud may channel all of the airflow through a single ECD surface. The details of this configuration may depend the requirements of airflow rates and dynamics, ECD surface area & capacity, geometry of available space, etc.

V. Controls Components and Sequences

Some embodiments of the present disclosure may comprise one or more sensors. Further embodiments may comprise one or more controllers. The one or more controllers may be further described as computing device 1000 herein. As will be detailed with reference to FIG. 10 below, the computing device configured to control the ECD may comprise, but not be limited to, for example, an integrated controller, controller for a building automation system, a desktop computer, laptop, a tablet, or mobile telecommunications device. Though the present disclosure is written with reference to an integrated controller, it should be understood that any computing device may be employed to provide the various embodiments disclosed herein. In further embodiments, a user may be able to manually control the ECD, for example to manually optimize parameters, such as, for example, motor speed. In such embodiments, the user may access the computing device via a software application.

FIGS. 5*a* and 5*b* are layouts showing some of the ECD's primary control sensors 505. Temperature sensors may be placed within the "loop" of the screen, situated in the x-y plane. One purpose of these temperature sensors may be to detect the "wetbulb" temperature of the evaporatively-cooled airstream. The sensors may be placed at known locations along the x-y plane of the ECD panel (rows and columns). In some embodiments control algorithms may use their respective signals to track the cooling effect at various locations in the plane. For example, some control algorithms may seek to achieve sufficient cooling at the top row of the plane (farthest from the water basin), while not delivering excessive water. The temperature gradient along the vertical y-axis may indicate the relative evaporation rate of water at different heights. If more cooling capacity is needed at the top rung, the motor's speed may increase to deliver water at a faster rate. If the top row is just as cool as rows below it, it may indicate that water is being conveyed at an excessive rate, and the control loop may reduce the motor's speed accordingly. Various combinations of standard evaporative cooling control logic, including Proportional-Integral-Derivative (PID) algorithms may be adapted to the ECD's unique characteristics.

Further embodiments may comprise a psychrometric sensor 510. An outdoor psychrometric sensor array is shown in the top-right corner of FIG. 5*a*. This sensor may provide data to the ECD controller about the ambient conditions of the surrounding atmosphere. Using inputs such as drybulb temperature, humidity, pressure, and altitude, the psychrometric sensor may allow the controller to determine how much evaporative cooling is achievable given the current ambient conditions.

As the ambient air's relative humidity rises, evaporative cooling capacity may be diminished because the ambient air cannot accept as much water vapor; i.e., the air is approaching "saturation." When the outdoor air reaches 100% relative humidity, no evaporative cooling is possible; the air's drybulb and wetbulb temperature are equal. As relative humidity falls below 100%, evaporative cooling capacity increases, and the air's wetbulb temperature progressively falls below the drybulb temperature. When ambient air is at very low humidity, evaporative cooling capacity is greatest (with wetbulb temperature much lower than drybulb). These psychrometric principles may be fundamental to all evaporative cooling control logic.

Some embodiments of the present disclosure may comprise additional control components. FIG. 6 provides further detail on some additional control components for an ECD consistent with embodiments of the present disclosure. FIG. 7 provides detail on some additional main control components for an ECD consistent with embodiments of the present disclosure. The psychrometric and temperature sensors may be analog (continuously-variable) inputs to the controller. A float switch 605 in the water basin may provide a binary (discrete/on-off) signal to the controller to confirm sufficient water level 610 in the basin. A discrete "run" contact may provide a binary input to signal the controller that the condenser/HRD is active and thus evaporative cooling may be enabled. The controller may have a binary output to command a solenoid valve 705 to fill the water basin as its level falls below the float switch's threshold. Additionally, the controller may have a continuously-variable output to the command the speed of the drive motor. In some embodiments, this motor speed signal may be analog (e.g., 0-10 VDC, 4-20 mA), or digitally pulse-width-modulated (PWM). The ECD's cooling capacity may be precisely controlled by modulating a single variable: the speed of the drive motor. A water supply may plumbed to the system (e.g., from a domestic water supply). Further embodiments may comprise other mechanical components, such as, for example water filters, water softeners, check valves, etc.

Basic Boolean logic may provide "permissives" and interlocks to enable/disable the system. PID loop logic may manage the modulation of motor speed (cooling capacity) according to temperature and psychrometric inputs. Additional alarm logic may be incorporated to prevent operation during abnormal or unsafe conditions. Some embodiments of the present disclosure may comprise audible alarms.

FIG. 8 conveys a potential control logic flow 800 for the ECD controller. Although method 800 has been described to be performed by computing device 1000, it should be understood that, in some embodiments, different operations may be performed by different networked elements in operative communication with computing device 1000.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 800 will be described in greater detail below.

Method 800 may begin at stage 805, where the computing device 1000 may check to see if a heat rejection device is running. For example, the computing device 1000 may check the on/off status of a fan driving the heat rejection device.

From stage 805, method 800 may proceed to stage 810, where the computing device 1000 may check to see if any alarms are active. For example, various checks may be performed to determine whether or not the ECD may run effectively and safely, including, but not limited to, adequate water in the basin, too much water in the basin, adequate power coupled to one of the components (e.g., the motor, the controller, a solenoid valve, and a sensor), operating temperature of the components, and whether or not a fuse has been blown. If any alarms are active, an alarm may be annunciated in stage 815. For example, an audible alarm may be activated, or a building automation system may receive a notification. As long as the alarm conditions are not cleared, the computing device 1000 may continue to annunciate the alarm as well as prevent the ECD from starting. The computing device 1000 may routinely check to see whether or not the alarm has been cleared in stage 820.

If no alarms are active, the computing device 1000 may check to for a relative humidity threshold in stage 825. For example, if the relative humidity is above a certain amount (e.g., 90%), computing device 1000 may prevent the ECD from activating. If the relative humidity is below the threshold, the ECD may activate in stage 830. For example, the computing device 1000 may cause a supply water solenoid valve to open to fill the basin to an operational level. Further, the computing device 1000 may cause the motor to start moving. In some embodiments, the motor may be started at a minimum speed.

Once the computing device 1000 activates the ECD in stage 830, method 800 may proceed to stage 835, where computing device may 1000 take sensor readings. For example, sensors near the top of the device may be used to calculate an initial optimal motor speed. Method 800 may then proceed to stage 840, where the computing device 1000 may utilize a PID loop to modulate the motor speed by continually monitoring sensor outputs.

Concurrent with stage 840, the computing device 1000 may check to see for active alarms in stage 845. For example, if the water reaches a minimum level, the computing device 1000 may deactivate the ECD in stage 850 (e.g., close the water supply valve and stop the motor). Then method 800 may proceed to stage 815.

Alternatively, if no alarms are active, the ECD may continue to operate in an activated mode as long as the heat rejection device is running.

VI. Materials of Construction

The ECDs' materials of construction may address the harsh conditions of the outdoor environment, as well as the details of the HEDs they are attached to. Durable, outdoor-rated, UV-resistant plastic may be used for the frame and rollers. Stainless steel or plastic bearings may be used for the rollers' internal mounting shafts. The drive motor may be enclosed and rated for outdoor, wet use; considerations may be given for the motor's proper ventilation and internal cooling, as well as any electrical safety considerations: including (but not limited to) ground-fault isolation, and safe operating voltages.

The screen material may be made of outdoor-rated plastic mesh, with high resilience and flexibility to facilitate its motion around the rollers. The material may have sufficient elasticity to facilitate proper tension with the rollers. The screen may also be constructed to have a high reflectivity of solar energy to minimize heat gain and UV damage. This may be achieved by the application of a reflective coating. In further embodiments, the high reflectivity may be incorporated into the composition of the screen material itself.

The controller may be constructed under typical best practices used for industrial PLCs. Accordingly, considerations may be given for:

outdoor and indoor mounting options
NEMA ratings
NEC requirements
UL and CE requirements
Expansion capabilities (networking, integrating multiple controllers on large systems, etc.)

The ECD's systems, particularly the outdoor components, may have integrated measures to mitigate:

Electrostatic discharge (dissipative materials and/or grounding)
Lightning & Transient Voltage surges
Corrosion issues (including those associated with dissimilar metals among ECD and HED components)
Environmental hazards (hazardous weather, seismic events, etc.)

VII. Enhancements

In further embodiments, the ECD may be further enhanced with additional accessories. One such example is depicted in FIG. 9. A Condensate Recovery System 900 may be integrated into the air conditioner's evaporator condensate drip tray. Evaporator condensate that would normally go to drain may be collected and used as cooling water. This may offset or eliminate the use of an external/domestic water supply. An opportune application of this may be on packaged rooftop units (RTUs). Because of their remote roof location, RTUs may not have readily-accessible water piping, so condensate recovery may provide a practical water source.

VIII. Novel Advantages of ECD and its Methods

This method provides numerous advantages over others typically used to administer evaporative cooling water. Common methods consist of water nozzles that spray water mist onto the surface of the HRD (assumed to be a condenser hereafter). This spraying configuration can be difficult to adjust geometrically, as the mist is most effective when applied in a homogeneous pattern that perfectly contacts all of the surfaces of the condenser. Multiple spray nozzles are often implemented to mitigate this challenge; as a result, some sections of the condenser surface may be "over sprayed," receiving more water than necessary which hence forms droplets that deflect or fall down the surface as waste. Moreover, spray nozzles are susceptible to clogs and fouling from water deposits which hinder their effectiveness; the clogs distort the spray pattern's geometry as well as its intended flow rate. Contrarily, with the ECD, if any excess water is conveyed and does not evaporate across the condenser, it will be primarily returned to the water basin on its next "trip". Or, it may still evaporate on its trip down to the water basin—providing secondary or pre-cooling. Also, geometrically, the ECD may provide a homogenous, controllable "sheet" of water for evaporation, thus enabling high-precision control of the amount of water delivered. The rate at which water is delivered by embodiments of the present disclosure may be precisely controlled by a single variable: the speed of the motor driving the assembly. The ECD is advantageous under windy conditions as well; even a moderate breeze may disrupt the propagation of a sprayed mist. The ECD's screen delivery approach is less susceptible to such wind.

Another advantage of embodiments of the present disclosure includes an ability to mitigate water deposit fouling of the condenser surface that may result of direct spray of domestic water—which often contains varying levels of deposits such as lime, calcium, and iron. In the ECD, as the water evaporates from the screen material, it tends to leave the deposits behind as they tend to "stick" to the screen material. Upon substantial buildup of deposits, the screen material may be removed for cleaning or replaced as needed.

Supplementary advantages may result from the application of a radiant-reflective coating on the screen material—a coating similar to popular "cool roof" treatments. The reflective coating may help shield the condenser from ambient sunlight, reducing solar heat gain at the surface of the condenser (which is often a dark-colored metal that tends to absorb solar heat). Additionally, even if the ECD's water conveying system fails, the presence of its screen material may provide a protective "filtering" effect for the air entering the condenser, protecting it from the common problems of dust, pollen, flowering plant material, and hail.

IX. Computing Device Architecture

In various embodiments, the ECD may comprise various integrated sensors, controllers, and computing components in operative communication with a centralized server, such as, for example, a cloud computing service or building automation system. In further embodiments, one or more controllers and computing components may be incorporated within a stand-alone ECD. Such computing elements may be embodied as, for example, but not limited to, computing device 1000.

Embodiments of the present disclosure may comprise a system having a memory storage and a processing unit. The processing unit may be coupled to the memory storage, wherein the processing unit is configured to perform the ECD controls.

FIG. 10 is a block diagram of a system including computing device 1000. Consistent with an embodiment of the disclosure, the aforementioned memory storage and processing unit may be implemented in a computing device, such as computing device 1000 of FIG. 10. Any suitable combination of hardware, software, or firmware may be used to implement the memory storage and processing unit. For example, the memory storage and processing unit may be implemented with computing device 1000 or any of other computing devices 1018, in combination with computing device 1000. The aforementioned system, device, and processors are examples and other systems, devices, and processors may comprise the aforementioned memory storage and processing unit, consistent with embodiments of the disclosure.

With reference to FIG. 10, a system consistent with an embodiment of the disclosure may include a computing device, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include motor speed calculation application 1020. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and nonvolatile, removable and non-removable media implemented in any method or technology for storage of information, such as computer readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1004, including operating system 1005. While executing on processing unit 1002, programming modules 1006 (e.g., motor speed calculation application 1020) may perform processes including, for example, ECD motor speed control as described above. The aforementioned process is an example, and processing unit 1002 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The invention claimed is:

1. An apparatus configured to draw an evaporative liquid into an air flow feeding into a refrigerant condenser coil, the apparatus comprising:
    at least two rollers;
        screen looped around the at least two rollers forming a layer on each side of the at least two rollers;
        at least one wetbulb temperature sensor located in between the layers of the screen;
        a basin configured to hold the evaporative liquid within an interior of the basin, wherein a portion of the screen is within the interior of the basin and is submerged within the evaporative liquid; and
        a motor coupled to one of the at least two rollers, wherein the motor is configured to drive the at least one roller and the screen such that the portion of the screen that is submerged within the evaporative liquid is drawn away from the basin and is exposed to air flow entering the refrigerant condenser coil,
        wherein a plane of a surface of the screen exposed to the air flow is perpendicular to the air flow and parallel to the refrigerant condenser coil such that the condenser coil receives the evaporative liquid as it evaporates from the surface of the screen.

2. The apparatus of claim 1, further comprising a gasket configured to seal the apparatus to an intake of the refrigerant condenser coil.

3. The apparatus of claim 1, further comprising:
    at least two sensors,
        wherein a first sensor is positioned externally so as to capture at least one metric of an environmental condition outside of the apparatus,
        wherein the at least one wetbulb temperature sensor is positioned internally so as to capture at least one metric of an environmental condition inside of the apparatus; and
        a controller in operative communication with the at least two sensors and the motor, wherein the controller is configured to:
        receive at least one reading from each of the at least two sensors,
        analyze the at least one reading from each of the at least two sensors in order to determine an effectiveness of evaporative cooling of the refrigerant condenser coil, wherein the analysis is comprised of a comparison of a first reading from the first sensor relative to a second reading from the second sensor, and
        variably control the motor's speed during motor operation based on the analysis of the at least one reading from the at least two sensors.

4. The apparatus of claim 3, wherein the first sensor comprises at an exterior psychrometric sensor.

5. The apparatus of claim 4, wherein the controller is configured to variably adjust the motor's operation speed based on readings of at least two measurements from: the wetbulb temperature and the exterior air psychrometric sensor.

6. The apparatus of claim 1, further comprising: a water level measuring device positioned within the interior of the basin; and a valve coupled to a water source and configured to:
    open when the water level measuring device senses a low limit, and
    close when the water level measuring device senses a high limit.

7. The apparatus of claim 1, wherein the basin is configured to receive an air conditioner's evaporator condensate.

8. The apparatus of claim 1, wherein the screen is reflective of solar heat.

9. A refrigerant condenser system, comprising:
    a fan for generating airflow;
    a condenser coil positioned to reject heat to outside air; and
    an evaporative cooling device (ECD) comprising:
        at least two rollers,
        a screen looped around the at least two rollers forming a layer on each side of the at least two rollers, wherein the screen is perpendicular to the airflow and parallel and adjacent to the condenser coil,
        at least one wetbulb temperature sensor located in between the layers of the screen;
        a basin configured to hold an evaporative liquid within an interior of the basin, wherein a portion of the screen is submerged within the evaporative liquid, and
        a motor coupled to at least one roller of the at least two rollers and configured to drive the at least one roller, wherein the motor is configured operate the at least one roller such that the portion of the screen that is submerged within the evaporative liquid is drawn away from the basin and is exposed to air flow entering the refrigerant condenser coil.

10. The system of claim 9, further comprising:
    at least two sensors,
        wherein a first sensor is positioned externally so as to capture at least one metric of an environmental condition outside of the apparatus,
        wherein the at least one wetbulb sensor is positioned internally so as to capture at least one metric of an environmental condition inside of the apparatus; and
        a controller in operative communication with the at least two sensors and the motor, wherein the controller is configured to:
        receive at least one reading from each of the at least two sensors,
        analyze the at least one reading from each of the at least two sensors in order to determine an effectiveness of evaporative cooling of the refrigerant condenser coil, wherein the analysis is comprised of a comparison of a first reading from the first sensor relative to a second reading from the second sensor, and
        variably control the motor's speed during motor operation based on the analysis of the at least one reading from the at least two sensors.

11. An apparatus configured to draw liquid into an air flow feeding into a refrigerant condenser coil, the apparatus comprising:
    at least two rollers;
    a screen looped around the at least two rollers;

a basin configured to hold an evaporative liquid within an interior of the basin, wherein a portion of the screen is within the interior of the basin and is submerged within the evaporative liquid;

a water level measuring device positioned within the interior of the basin;

a controller configured to control, upon a determination that there is insufficient water to source the basin, at least one of the following:
- a first valve for regulating a flow of condensate into the basin, and
- a second valve for regulating a flow of the water source into the basin;

a motor coupled to one of the at least two rollers, wherein the motor is configured to drive, upon receiving a signal that the condenser coil is operative, the at least one roller and the screen such that the portion of the screen that is submerged within the evaporative liquid is drawn away from the basin and is exposed to air flow entering the refrigerant condenser coil, wherein a plane of a surface of the screen exposed to the air flow is perpendicular to the air flow and parallel to the refrigerant condenser coil such that the condenser coil receives the evaporative liquid as it evaporates from the surface of the screen.

12. The system of claim 11, further comprising:

at least two sensors, wherein a first sensor is positioned externally so as to capture at least one metric of an environmental condition outside of the apparatus, wherein the at least one wetbulb sensor is positioned internally so as to capture at least one metric of an environmental condition inside of the apparatus; and a controller in operative communication with the at least two sensors and the motor, wherein the controller is configured to:
- receive at least one reading from each of the at least two sensors,
- analyze the at least one reading from each of the at least two sensors in order to determine an effectiveness of evaporative cooling of the refrigerant condenser coil, wherein the analysis is comprised of a comparison of a first reading from the first sensor relative to a second reading from the second sensor, and
- variably control the motor's speed during motor operation based on the analysis of the at least one reading from the at least two sensors.

13. The apparatus of claim 6, further comprising a controller configured to control at least one of the following:
- a first valve for regulating the flow of condensate into the basin; and
- a second valve for regulating the flow of the water source into the basin.

14. The apparatus of claim 13, wherein the controller is configured to control the at least one of the first valve and the second valve upon a determination that there is insufficient condensate to source the basin.

15. The apparatus of claim 1, further comprising a control system associated with the motor is enabled upon receipt of a signal indicating that the refrigerant condenser coil is running, wherein the control system is configured to operate the motor so as to control an operation and a speed of the at least one roller.

16. The apparatus of claim 5, wherein additional wetbulb sensors are positioned relative to different portions of the screen so as to detect the liquid evaporating from each relative position.

17. The apparatus of claim 16, wherein the speed of the motor is adjusted based on readings from the additional wetbulb sensors so as to increase or decrease a mass flow rate of the evaporative cooling liquid from each relative position.

18. The system of claim 9, wherein additional ECDs are positioned around on a plurality of inlet surfaces of the refrigerant condenser system.

19. The system of claim 9, further comprising a fan for generating airflow through the refrigerant condenser coil.

* * * * *